(12) United States Patent
Xue et al.

(10) Patent No.: US 12,442,948 B1
(45) Date of Patent: Oct. 14, 2025

(54) BOREHOLE-TO-SURFACE NEAR-SOURCE TRANSIENT ELECTROMAGNETIC HIGH-PRECISION EXPLORATION METHOD

(71) Applicant: Institute of Geology and Geophysics, Chinese Academy of Sciences, Beijing (CN)

(72) Inventors: Guoqiang Xue, Beijing (CN); Weiying Chen, Beijing (CN); Junjie Xue, Beijing (CN); Yulian Zhu, Beijing (CN); Pengfei Lv, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/238,389

(22) Filed: Jun. 14, 2025

(30) Foreign Application Priority Data

Mar. 26, 2025 (CN) .......................... 202510366840.8

(51) Int. Cl.
 *G01V 3/38* (2006.01)
 *G01V 3/20* (2006.01)
 *G01V 3/26* (2006.01)

(52) U.S. Cl.
 CPC .................. *G01V 3/38* (2013.01); *G01V 3/20* (2013.01); *G01V 3/26* (2013.01)

(58) Field of Classification Search
 None
 See application file for complete search history.

(56) References Cited

U.S. PATENT DOCUMENTS

| 8,638,103 B2 * | 1/2014 | Rosthal | G01V 3/30 324/365 |
| 2012/0268135 A1 * | 10/2012 | Marsala | G01V 3/30 324/338 |

(Continued)

FOREIGN PATENT DOCUMENTS

CN 115903053 A * 4/2023

OTHER PUBLICATIONS

CN115903053A translation (Year: 2023).*

*Primary Examiner* — Lina Cordero
(74) *Attorney, Agent, or Firm* — Hemisphere Law, PLLC; Zhigang Ma

(57) ABSTRACT

A borehole-to-surface near-source transient electromagnetic high-precision exploration method pioneers a BSEM acquisition method, obtained high-precision electrical data is processed and interpreted, which is a technological innovation and breakthrough in applying electrical exploration for gas-water differentiation in low-porosity, low-permeability gas reservoirs. The high-precision electrical gas-water differentiation method serves as a novel and effective gas-water differentiation approach complementary to conventional borehole/well logging and seismic exploration, it enables direct qualitative and quantitative evaluation of gas-bearing targets and is a gas-water differentiation technology that can indicate boundaries and scopes of the gas-bearing targets, thus can provide high-confidence gas-rich target indications for development of borehole pattern arrangement, especially horizontal borehole/well arrangement, and achieve the goal of efficient development with fewer borehole/wells but higher yields. The exploration method achieves both high resolution resistivity of the target formations and large-radius lateral resistivity detection, and serving as an effective (Continued)

geophysical exploration tool for unconventional oil-gas-water detections.

2 Claims, 3 Drawing Sheets

(56) References Cited

U.S. PATENT DOCUMENTS

| | | | |
|---|---|---|---|
| 2015/0061684 A1* | 3/2015 | Marsala | E21B 49/00 324/355 |
| 2016/0178787 A1* | 6/2016 | Le | G01V 3/38 702/7 |
| 2017/0242146 A1* | 8/2017 | Itskovich | E21B 49/00 |
| 2017/0351000 A1* | 12/2017 | Marsala | G01V 3/38 |
| 2020/0003927 A1* | 1/2020 | Xue | G01V 3/081 |

* cited by examiner

BOREHOLE-TO-SURFACE NEAR-SOURCE TRANSIENT ELECTROMAGNETIC HIGH-PRECISION EXPLORATION METHOD

TECHNICAL FIELD

The disclosure relates to the field of geological exploration technologies, and particularly to a borehole-to-surface near-source transient electromagnetic high-precision exploration method.

BACKGROUND

In exploration and development of unconventional oil and gas reservoirs, it is a hot topic how to achieve an efficient production goal of fewer boreholes but higher yields during a development stage. Given that the unconventional oil and gas reservoirs feature greater buried depths, with target formations characterized by multi-layered per-borehole configurations, multi-segment per-layer characteristics, complex oil-gas interactions, and strong reservoir heterogeneity. A conventional surface-based controlled-source time-frequency electromagnetic (TFEM) method can no longer meet production needs for oil-gas-water differentiation in the exploration and development of unconventional oil and gas reservoirs. A borehole-to-surface time-domain induced polarization electromagnetic method (BSTEM), by deploying transmitting electrodes at specific depths between top and bottom interfaces of a target formation along a borehole for being excited or energized, can maximize suppression of interfering layer and enhance responses of oil and gas reservoirs from the target formation under time-domain induced polarization electromagnetic excitation. As early as the 1970s, Soviet experts have proposed using borehole-to-surface electrical methods to delineate oil and gas boundaries. Drilling-integrated borehole-to-surface electromagnetic exploration methods, which involve injecting electrical currents into boreholes and measuring resultant electromagnetic fields at the surface, are a kind of electromagnetic methods and mainly used for delineating oil and gas reservoir boundaries and predicting prospective oil and gas bearing zones around known reservoirs. The disclosure aims to provide a near-source acquisition configuration and processing-interpretation technology based on the borehole-to-surface time-domain induced polarization electromagnetic method, through acquisition of secondary field signals, it can synergistically achieve a "magnifying lens" of high-resolution resistivity for target formations and a "telescope" for large-radius oil-gas-water boundary detection.

SUMMARY

To solve the above technical problems, the disclosure provides a borehole-to-surface near-source transient electromagnetic high-precision exploration method to solve the problems in the related art. The technical solutions proposed by the disclosure may be as follows:

Specifically, a borehole-to-surface near-source transient electromagnetic high-precision exploration method according to an embodiment of the disclosure includes steps as follows:

Step 1: data acquisition of target formation in a manner of surface-based fixed receiving and in-borehole movable transmitting is prepared/conducted, which includes that multiple receivers are deployed on a surface along a survey line at intervals of 50 meters, a movable transmitting electrode is placed in a borehole at one of positions including three positions of B1, B2 and B3, and a fixed transmitting electrode A0 is placed at a head location of the borehole on the surface.

Step 2: a bipolar rectangular zero-crossing step current with an intensity of 40 amperes (A) is transmitted to a periphery of the borehole through the fixed transmitting electrode A0 and the movable transmitting electrode at the position B3, and electric field component data in electromagnetic component $Ex_{AB3}(t)$ are observed and recorded through the multiple receivers deployed along the survey line on the surface.

Step 3: the movable transmitting electrode in the borehole is moved from the position B3 to the position B2, a bipolar rectangular zero-crossing step current with an intensity of 40 A is transmitted to the periphery of the borehole through the fixed transmitting electrode A0 and the movable transmitting electrode at the position B2, and electric field component data in electromagnetic component $Ex_{AB2}(t)$ are observed and recorded through the multiple receivers deployed along the survey line on the surface.

Step 4: the movable transmitting electrode in the borehole is moved from the position B2 to the position B1, a bipolar rectangular zero-crossing step current with an intensity of 40 A is transmitted to the periphery of the borehole through the fixed transmitting electrode A0 and the movable transmitting electrode at the position B1, and electric field component data in electromagnetic component $Ex_{AB1}(t)$ are observed and recorded through the multiple receivers deployed along the survey line on the surface.

Step 5: apparent resistivity values of a target formation are determined based on electric field component data associated with the electric field component data in electromagnetic component $Ex_{AB3}(t)$, the electric field component data in electromagnetic component $Ex_{AB2}(t)$ and the electric field component data in electromagnetic component $Ex_{AB1}(t)$, and oil-bearing zones are inferred based on the apparent resistivity values of the target formation.

In an embodiment, the electric field component data of the target formation is expressed as a formula (1) as follows:

$$Ex(t)=Ex_{AB3}(t)-Ex_{AB1}(t) \qquad (1)$$

where $Ex_{AB3}(t)$ represents electric field energy recorded during the transmitting through the fixed transmitting electrode A0 and the movable transmitting electrode at the position B3; and $Ex_{AB1}(t)$ represents electric field energy recorded during the transmitting through the fixed transmitting electrode A0 and the movable transmitting electrode at the position B1.

Apparent resistivity data of the target formation is calculated according to a formula (2) as follows:

$$R(t)=K_1 M^{2/3}/Ex(t)^{2/3} t^{5/3} \qquad (2)$$

where M represents a magnetic moment, and K represents a conductance constant calibrated by borehole logging data.

The conductance constant K is calculated according to a formula (3) as follows:

$$K=Ha/((Ra(t)^2 * t/\mu)) \qquad (3)$$

where Ra(t) represents a borehole logging resistivity, and Ha represents a depth corresponding to Ra(t). A cross-sectional profile is plotted based on the apparent resistivity values of the target formation as calculated.

In an embodiment, after obtaining the oil-bearing zones, boreholes are drilled in the oil-bearing zones, then oil pumping machines are established on the boreholes in the oil-bearing zones to extract oil and gas.

Beneficial effects of the disclosure may be as follows.

The disclosure pioneers an electrical data acquisition method of in-borehole based transmitting and surface-based receiving, by integrating high-precision geoelectrical data with seismic-electric cross-domain big data processing and interpretation, it has been successfully applied for gas-water differentiation in water-rich tight sandstone gas reservoirs in the Sulige Western Area. This represents a technological innovation and breakthrough in applying electrical exploration for gas-water differentiation in low-porosity, low-permeability gas reservoirs. The high-precision electrical gas-water differentiation method serves as a novel and effective gas-water differentiation approach complementary to conventional borehole/well logging and seismic exploration, it enables direct qualitative and quantitative evaluation of gas-bearing targets and is a gas-water differentiation technology that can indicate boundaries and scopes of the gas-bearing targets, thus can provide high-confidence gas-rich target indications for development of borehole pattern arrangement, especially horizontal borehole/well arrangement, and achieve the goal of efficient development with fewer borehole/wells but higher yields. Moreover, it can overcome exploration limitations of conventional well logging's "single-borehole perspective", and enable large radius resistivity detection for target formations of the borehole, thereby achieving both high-resolution resistivity of the target formations and large-radius lateral resistivity detection, and serving as an effective geophysical exploration tool for unconventional oil-gas-water detections.

DETAILED DESCRIPTION OF EMBODIMENTS

Below, technical solutions in embodiments of the disclosure will be clearly and completely described in conjunction with FIG. 1 through FIG. 4. Apparently, the described embodiments are only some of embodiments of the disclosure, not all of embodiments of the disclosure. Unless otherwise specified, technical means used in the described embodiments are conventional means well known to those skilled in the art.

A borehole-to-surface near-source transient electromagnetic high-precision exploration method utilizes a manner of surface-based fixed receiving and in-borehole movable transmitting to prepare/conduct data acquisition of a target formation.

Figure 1:
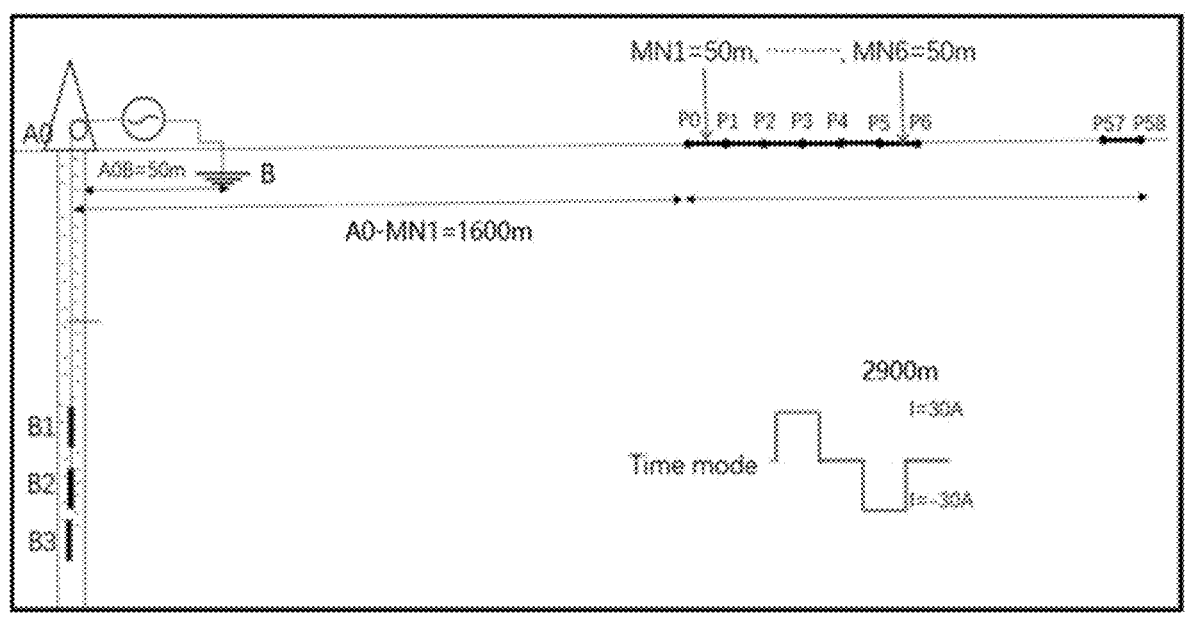
FIG. 1 illustrates an acquisition principle of the borehole-to-surface electromagnetic method.

In an embodiment, a working principle for the data acquisition is shown in FIG. 1, the method is suitable for the time-domain zero crossing electric pulse transmission of long wire sources in cased wellbores and boreholes. The transmitting electrode (e.g., movable transmitting electrode) is placed at different depths of the borehole between a top interface and a bottom interface of the target formation (e.g., position B1, position B2, and position B3) through an armored cable to emit bipolar rectangular zero-crossing step current with an intensity in a range of 30 A to 50 A. On the surface, MN electrodes (i.e., electrodes of the receivers) are deployed with a receiver spacing of 50 meters as per geological requirements to record electric field component data in electromagnetic component (Ex) of the secondary field signals generated underground during step current zero-crossing interruptions. The disclosure enhances a signal to noise ratio of observed signals, and moreover reduces volume effect impacts from the conventional TFEM, and improves resolution and accuracy of data processing.

In an embodiment, the borehole-to-surface near-source transient electromagnetic high-precision exploration method may include Step 1 through Step 5 as follows:

Step 1: data acquisition in a manner of surface-based fixed receiving and in-borehole movable transmitting is prepared, which includes that multiple receivers (P0-P58) are deployed on a surface along a survey line at intervals of 50 meters, a movable transmitting electrode is placed in a borehole at one of positions including three positions of B1, B2 and B3, and a fixed transmitting electrode A0 is placed at a head location of the borehole on the surface.

Step 2: a bipolar rectangular zero-crossing step current with an intensity of 40 amperes (A) is transmitted to a periphery of the borehole through the fixed transmitting electrode A0 and the movable transmitting electrode at the position B3, and electric field component data in electromagnetic component $Ex_{AB3}(t)$ are observed and recorded through the multiple receivers deployed along the survey line on the surface.

Step 3: the movable transmitting electrode in the borehole is moved from the position B3 to the position B2, a bipolar rectangular zero-crossing step current with an intensity of 40 A is transmitted to the periphery of the borehole through the fixed transmitting electrode A0 and the movable transmitting electrode at the position B2, and electric field component data in electromagnetic component $Ex_{AB2}(t)$ are observed and recorded through the multiple receivers deployed along the survey line on the surface.

Step 4: the movable transmitting electrode in the borehole is moved from the position B2 to the position B1, a bipolar rectangular zero-crossing step current with an intensity of 40 A is transmitted to the periphery of the borehole through the fixed transmitting electrode A0 and the movable transmitting electrode at the position B1, and electric field component data in electromagnetic component $Ex_{AB1}(t)$ are observed and recorded through the multiple receivers deployed along the survey line on the surface.

Step 5: apparent resistivity values of a target formation are determined based on electric field component data associated with the electric field component data in electromagnetic component $Ex_{AB3}(t)$, the electric field component data in electromagnetic component $Ex_{AB2}(t)$ and the electric field component data in electromagnetic component $Ex_{AB1}(t)$, and hydrocarbon-bearing zones are inferred based on the apparent resistivity values of the target formation.

In an embodiment, the electric field component data of the target formation is expressed as a formula (1) as follows:

$$Ex(t)=Ex_{AB3}(t)-Ex_{AB1}(t) \quad (1)$$

where $Ex_{AB3}(t)$ represents electric field energy recorded during the transmitting through the fixed transmitting electrode A0 and the movable transmitting electrode at the position B3 (e.g., the fixed transmitting electrode A0 and the movable transmitting electrode at the position B3 are excited or energized); and $Ex_{AB1}(t)$ represents electric field energy recorded during the transmitting through the fixed transmitting electrode A0 and the movable transmitting electrode at the position B1 (e.g., the fixed transmitting electrode A0 and the movable transmitting electrode at the position B1 are excited or energized).

Apparent resistivity data of the target formation is calculated according to a formula (2) as follows:

$$R(t)=K_1 M^{2/3}/Ex(t)^{2/3} t^{5/3} \qquad (2)$$

where M represents a magnetic moment, and K represents a conductance constant calibrated by borehole logging data.

The conductance constant K is calculated according to a formula (3) as follows:

$$K=Ha/((Ra(t)^2 * t/\mu)) \qquad (3)$$

where Ra(t) represents a borehole logging resistivity, and Ha represents a depth corresponding to Ra(t). A cross-sectional profile is plotted based on the apparent resistivity values of the target formation as calculated.

The disclosure pioneers a borehole-to-surface electromagnetic (BSEM) acquisition method, by integrating high-precision geoelectrical data with seismic-electric cross-domain big data processing and interpretation, it has been successfully applied for gas-water differentiation in water-rich tight sandstone gas reservoirs in the Sulige Western Area. This represents a technological innovation and breakthrough in applying electrical exploration for gas-water differentiation in low-porosity, low-permeability gas reservoirs. The high-precision electrical gas-water differentiation method serves as a novel and effective gas-water differentiation approach complementary to conventional borehole/well logging and seismic exploration, it enables direct qualitative and quantitative evaluation of gas-bearing targets and is a gas-water differentiation technology that can indicate boundaries and scopes of the gas-bearing targets, thus can provide high-confidence gas-rich target indications for development of borehole pattern arrangement, especially horizontal borehole/well arrangement, and achieve the goal of efficient development with fewer borehole/wells but higher yields. Moreover, it can overcome exploration limitations of conventional well logging's "single-borehole perspective", and enable large radius resistivity detection for target formations of the borehole, thereby achieving both high-resolution resistivity of the target formations and large-radius lateral resistivity detection, and serving as an effective geophysical exploration tool for unconventional oil-gas-water detections.

As shown in FIG. 1, high-quality electromagnetic exploration data can be obtained by using the exploration method of the disclosure. A transmitting source includes two types of transmitting electrodes: one is buried in the surface (i.e., the fixed transmitting electrode A0) and the other is attached to the borehole wall (i.e., the movable transmitting electrode). Power is supplied to the two types of transmitting electrodes through a transmitter on the surface, with a power supply mode being time mode. The transmitting electrode buried in the surface is in a fixed position, while the transmitting electrode attached to the borehole wall is in a movable manner. After each termination of power supply, the transmitting electrode attached to the borehole wall shifts along the borehole wall and then re-powered. The receivers are fixed on the surface and configured/used to capture/receive electromagnetic signals from different electrode combinations. The received electromagnetic signals are related to the geological body and are signals induced by the geological body.

Figure 2:
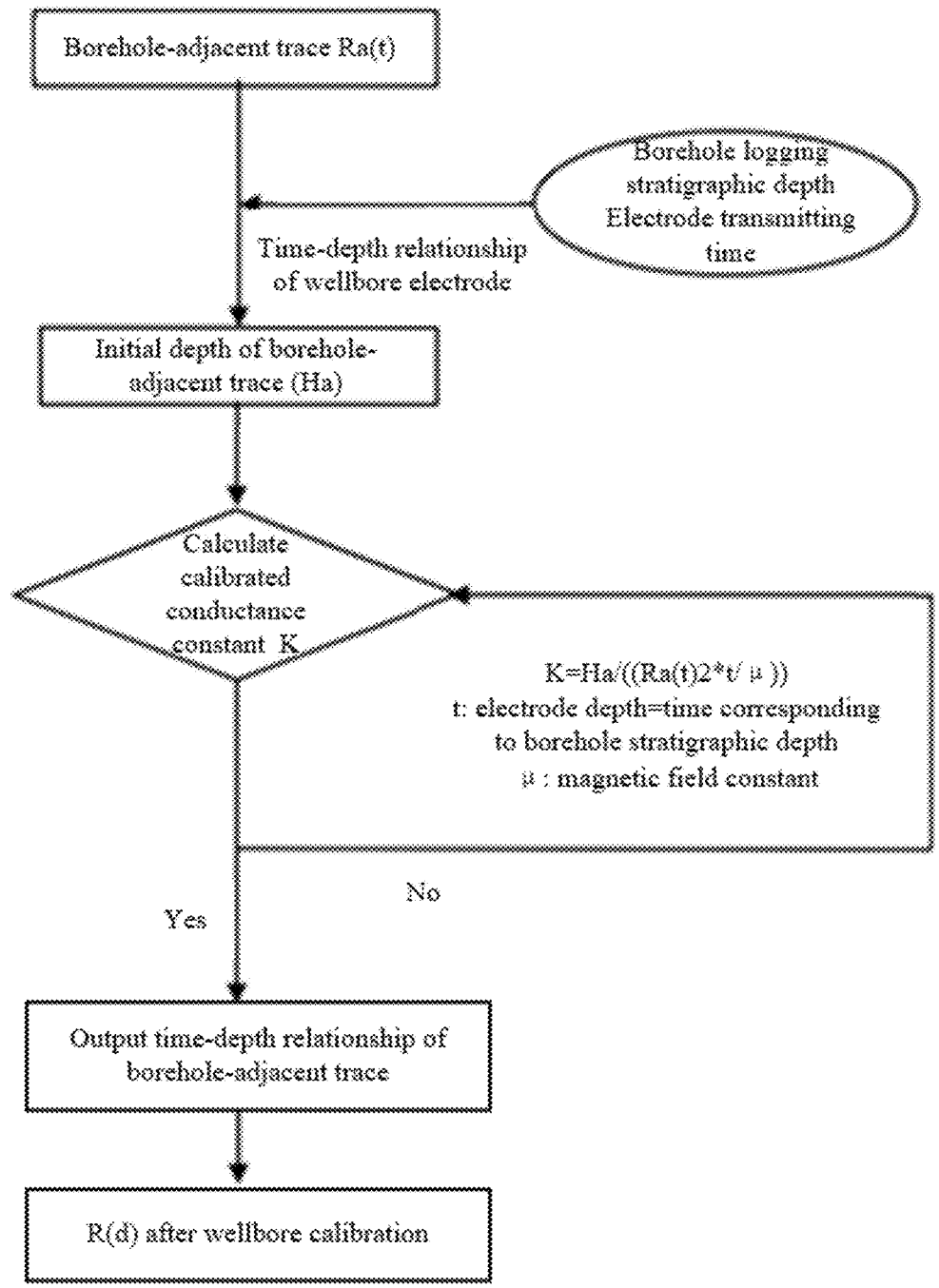
FIG. 2 illustrates a schematic flowchart of depth-time conversion associated with borehole-adjacent trace and borehole calibration.
Figure 3:
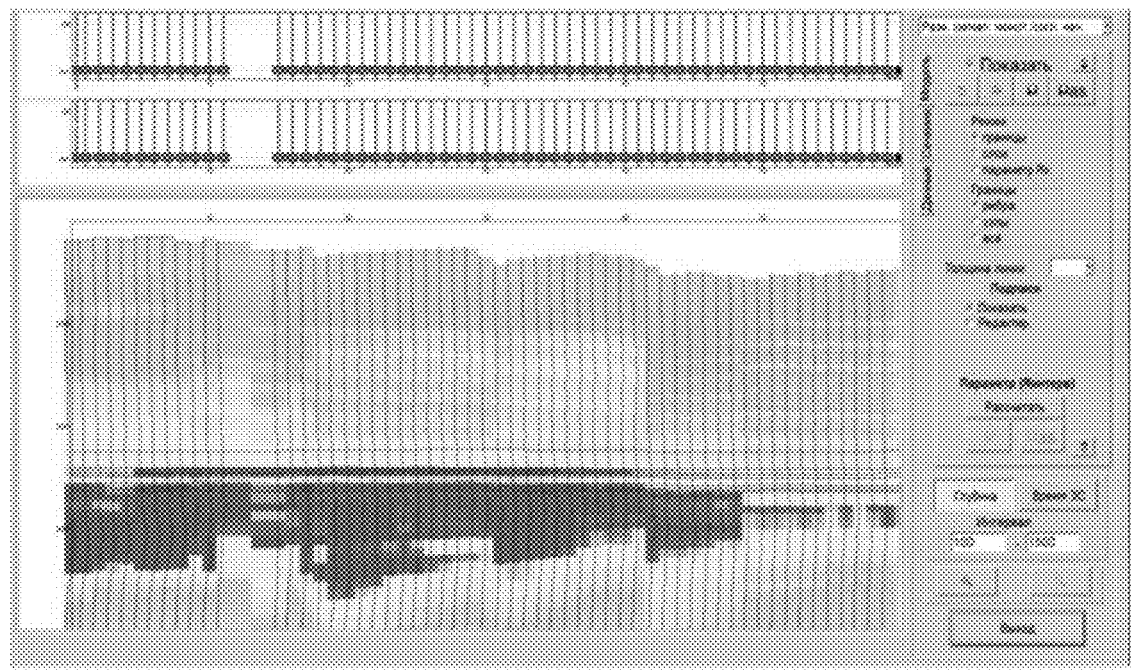
FIG. 3 illustrates a two-dimension (2D) depth-domain profile along a survey line associated with an electrical method.

As shown in FIG. 2, based on the obtained high-quality electromagnetic exploration data, apparent resistivity values of the target formation closely related to properties of the geological body are calculated out. Finally, based on the apparent resistivity values of the target formation, hydrocarbon-bearing (e.g., oil-bearing) zones can be inferred. The flowchart in FIG. 2 illustrates how to convert observation time related data into depth related data and how to convert observed voltage signals into apparent resistivity data.

Figure 4:
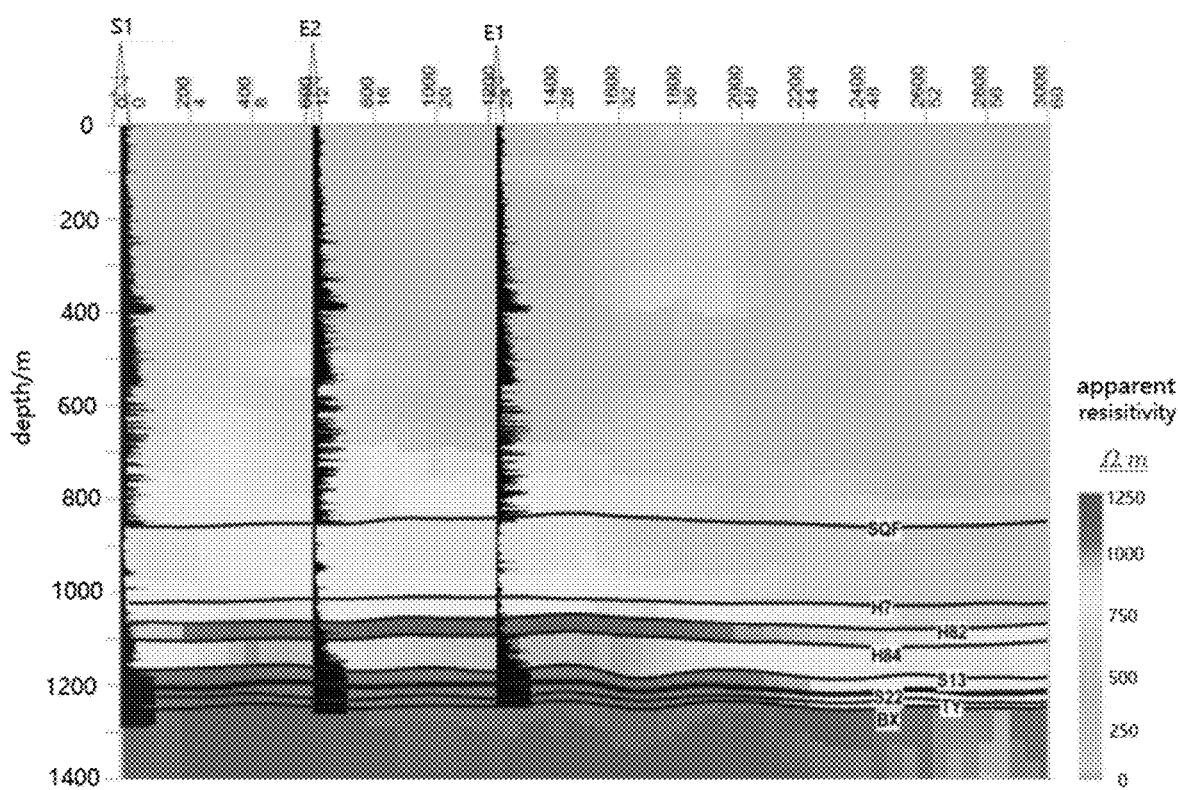
FIG. 4. illustrates a 2D depth-domain resistivity profile along the survey line associated with the electrical method.

FIG. 4 illustrates an implementation effect of the disclosure. Zones with high apparent resistivity appear in dark black colors, while rest zones with low apparent resistivity appear in light black colors. The zones with high apparent resistivity are related to the oil and gas reservoirs, and three boreholes are drilled at the zones with high apparent resistivities, all of which show oil and gas. The zones with low apparent resistivity are related to a covering formation. In FIG. 4, a vertical axis represents depth, a horizontal axis represents horizontal distance, and a color code on the right represents the apparent resistivity.

The above embodiments are only a description of preferred embodiments of the disclosure and do not limit the scope of protection of the disclosure. Without departing from the design spirit of the disclosure, various modifications, variations, and substitutions made by those skilled in the art to the technical solution of the disclosure should fall within the scope of protection determined by the appended claims of the disclosure.

What is claimed is:

1. A borehole-to-surface near-source transient electromagnetic high-precision exploration method, comprising:
    step 1: preparing data acquisition in a manner of surface-based fixed receiving and in-borehole movable transmitting, comprising:
        deploying a plurality of receivers on a surface along a survey line at intervals of 50 meters, placing a movable transmitting electrode in a borehole at one of positions including three positions of B1, B2 and B3, and placing a fixed transmitting electrode A0 at a head location of the borehole on the surface;
    step 2: transmitting a bipolar rectangular zero-crossing step current with an intensity of 40 amperes (A) to a periphery of the borehole through the fixed transmitting electrode A0 and the movable transmitting electrode at the position B3, and observing and recording electric field component data in electromagnetic component $Ex_{AB3}(t)$ through the plurality of receivers deployed along the survey line on the surface;
    step 3: moving the movable transmitting electrode in the borehole from the position B3 to the position B2, transmitting the bipolar rectangular zero-crossing step current with the intensity of 40 A to the periphery of the borehole through the fixed transmitting electrode A0 and the movable transmitting electrode at the position B2, and observing and recording electric field component data in electromagnetic component $Ex_{AB2}(t)$ through the plurality of receivers deployed along the survey line on the surface;
    step 4: moving the movable transmitting electrode in the borehole from the position B2 to the position B1, transmitting the bipolar rectangular zero-crossing step current with the intensity of 40 A to the periphery of the borehole through the fixed transmitting electrode A0 and the movable transmitting electrode at the position B1, and observing and recording electric field component data in electromagnetic component $Ex_{AB1}(t)$ through the plurality of receivers deployed along the survey line on the surface; and step 5: determining apparent resistivity values of a target formation based on the electric field component data in the electromagnetic component $Ex_{AB3}(t)$, the electric field component data in the electromagnetic component $Ex_{AB2}(t)$ and the electric field component data in the electromagnetic component $Ex_{AB1}(t)$, and inferring, based on the apparent resistivity values of the target formation, oil-bearing zones.

2. The borehole-to-surface near-source transient electromagnetic high-precision exploration method as claimed in claim 1, wherein electric field component data of the target formation is expressed as a formula (1) as follows:

$$Ex(t) = Ex_{AB3}(t) - Ex_{AB1}(t) \qquad (1)$$

where $Ex_{AB3}(t)$ represents electric field energy recorded during the transmitting through the fixed transmitting electrode A0 and the movable transmitting electrode at the position B3; $Ex_{AB1}(t)$ represents electric field energy recorded during the transmitting through the fixed transmitting electrode A0 and the movable transmitting electrode at the position B1, and t represents time;

wherein apparent resistivity data of the target formation is calculated according to a formula (2) as follows:

$$R(t) = K_1 M^{2/3} / Ex(t)^{2/3} t^{5/3} \qquad (2)$$

where M represents a magnetic moment, and K represents a conductance constant calibrated by borehole logging data;

wherein the conductance constant K is calculated according to a formula (3) as follows:

$$K = Ha / ((Ra(t)2*t/\mu)) \qquad (3)$$

where Ra(t) represents a borehole logging resistivity, and Ha represents a depth corresponding to Ra(t);

wherein a cross-sectional profile is plotted based on the apparent resistivity values of the target formation as calculated.

* * * * *